Patented June 6, 1939

2,161,025

UNITED STATES PATENT OFFICE 2,161,025

COATING COMPOSITION

Arthur K. Doolittle, South Charleston, W. Va., assignor to Carbide and Carbon Chemicals Corporation, a corporation of New York No Drawing. Application September 10, 1936, Serial No. 100,110

4 Claims. (Cl. 260—17)

The invention relates to lacquers, varnishes and similar compositions adapted for use in the forming of ornamental and protective surface coatings. It is particularly concerned with coating compositions in which the essential film-forming ingredients are certain vinyl resins and a cellulose derivative such as cellulose nitrate.

The vinyl resins employed in this invention are those formed by the conjoint polymerization of a vinyl halide with a vinyl ester of a lower aliphatic acid, such as are disclosed in U. S. Patent No. 1,935,577 to E. W. Reid. Within the broader class of such artificial resins, the conjoint polymer of vinyl chloride and vinyl acetate containing 65% to 70% vinyl chloride is especially suitable, and with it I propose to mix a cellulose derivative, such as nitrocellulose, to provide an intimately and completely dispersed coating composition adapted to produce excellent finishes of improved durability and resistance to humidity and moisture.

Lacquers of vinyl resin compounds have heretofore been made, and it has been indicated that nitrocellulose in combination with such resins will impart valuable characteristics to a coating film. In formulas previously proposed, however, where conjointly polymerized vinyl resins have been employed, those resins containing more than about 60% vinyl chloride have not shown satisfactory compatibility in mixture with nitrocellulose and many of the usual vinyl resin solvents. Addition of coal tar hydrocarbons to the thinner mixture will improve compatibility in the liquid composition, but since the coal tar hydrocarbons commercially available are limited to relatively fast evaporating liquids, advantage cannot be taken of the improvement effected by the use of coal tar hydrocarbons when more slowly drying lacquers, such as brushing lacquers or roll-coating lacquers, are required. The essential nitrocellulose and vinyl resin solvent in lacquers for many purposes must be an ester, ketone, or ether alcohol, and where slow drying is desirable, the solvent employed is one of high boiling range. If the diluent in such a mixture is a coal tar hydrocarbon, this portion of the thinner will evaporate from an applied film much more rapidly than the high boiling solvent, whereby conditions engendering incompatibility develop with a resulting decided blush in the dried surface coating. It has therefore been considered necessary in compounding lacquers of this type, which are adapted as brushing or roll-coating finishes, to sacrifice the improved durability of a film of high chloride vinyl resin in order to gain compatibility with the commercially available high-boiling solvents and diluents.

I have now discovered a class of solvent materials, novel in their application to the compounding of vinyl resin lacquers, which have excellent solvent power for such resins, and in addition exert a coupling action effective to produce complete compatibility in the same solution of mixtures of the high vinyl chloride containing resins above described and cellulose derivatives. Intimate and thorough dispersion of nitrocellulose and vinyl resin containing as high as 70% vinyl chloride is produced in these new solvents, and compatibility is maintained during drying of an applied film to produce a clear and transparent coating of excellent characteristics. The presence of the more volatile coal tar hydrocarbons is unessential, although they may be added to the thinner composition if desired, without any substantial effect on the compatibility of the complete lacquer formula.

The suitable solvents of my invention may be classed broadly as compounds of the polyether type wherein the structural molecule contains two or more alkyl ether groupings. Representative of these are certain diethers and triethers, which may be considered as derivatives of alkylene and polyalkylene glycols, including such specific compounds as the diethyl ether of ethylene glycol and the diethyl ether of diethylene glycol. The mixed diethers of these and other alkylene glycols may also be appropriate. From numerous experiments with a variety of these polyethers, there is indication that certain of them will exert a better coupling action than others, and some in fact do not show sufficient solvent power for the resin to be satisfactory. The polyether selected should, therefore, be one which will completely dissolve both the nitrocellulose and vinyl resin, and intimately disperse and couple the mixture in solution. These properties may be readily determined by test, although I have found that the coupling power appears to bear a certain relation to the ratio of carbon to oxygen atoms in the polyether compound. For example, diethyl ether of ethylene glycol contains carbon and oxygen atoms in the proportion of 3:1, and exhibits excellent solvent and coupling action, whereas the dibutyl ether of the same glycol, showing a carbon atom to oxygen atom ratio of 5, will not dissolve the resin mixture. Between these two, a compound such as ethyl butyl ether of ethylene glycol, with a carbon oxygen ratio of 4, is only a partial solvent. It is therefore indicated that the preferred polyether solvents will be found within the group in which the carbon atom to oxygen atom ratio is less than 4, although the invention should not be limited by this theory.

The following example is representative of a lacquer formula employing the new solvent and a vinyl resin containing 65% to 70% vinyl chloride, as prepared by the conjoint polymerization of vinyl chloride with vinyl acetate. The percentages are by weight, and the lacquer is a clear one for brush application.

|  | Per cent |
|---|---|
| Nitrocellulose | 6.7 |
| Vinyl resin | 13.3 |
| Diethyl ether of diethylene glycol | 32.0 |
| Monoethyl ether of ethylene glycol monoacetate | 8.0 |
| Hydrogenated petroleum naphtha * | 40.0 |

The following formula employs the same vinyl resin as above, and is a white pigmented brushing lacquer especially adapted for sealing plaster.

|  | Per cent |
|---|---|
| Titanium dioxide | 31.5 |
| Antimony oxide | 3.6 |
| Nitrocellulose | 4.05 |
| Vinyl resin | 8.8 |
| Dibutyl phthalate | 5.25 |
| Blown castor oil | .60 |
| Diethyl ether of diethylene glycol | 18.4 |
| Monoethyl ether of ethylene glycol monoacetate | 4.6 |
| Hydrogenated petroleum naphtha * | 23.0 |

Another composition including the same high chloride vinyl resin, and of the following formula, is a white lacquer especially adapted for application from a roller coating machine.

|  | Per cent |
|---|---|
| Titanium dioxide | 18.0 |
| Antimony oxide | 2.0 |
| Nitrocellulose | 6.0 |
| Vinyl resin | 6.0 |
| Dibutyl phthalate | 5.0 |
| Blown castor oil | 0.5 |
| Methyl n-amyl ketone | 18.75 |
| Diethyl ether of diethylene glycol | 12.5 |
| Steam distilled spirits of turpentine | 18.75 |
| Hydrogenated petroleum naphtha * | 12.5 |

*NOTE.—The hydrogenated petroleum naphtha employed in all three of the above formulas is a product widely used and commercially available under the trade name "Solvesso No. 2."

It will be evident from the above examples that the new solvents are adaptable in use to formulas employing a diversity of pigments, dyes, plasticizers, and other auxiliary agents which are well known in the compounding of lacquers and plastics. In the thinner composition other solvents may also be included, as may the usual types of hydrocarbon diluents. Only sufficient of the polyether is necessary to maintain satisfactory compatibility both in the original solution and in the drying lacquer film. Since the new solvents are in the class of those with a high boiling range, they are of particular advantage in brushing type lacquers, although their use is not restricted in this respect.

I claim:

1. A coating composition of slow drying characteristics especially adapted for application by brushing comprising as the essential film-forming ingredients a mixture of nitrocellulose and a vinyl resin resulting from the conjoint polymerization of vinyl chloride with vinyl acetate and containing more than 60% vinyl chloride in the polymer; and a solvent for said mixture, said solvent essentially including as both a solvent and coupling agent a dialkyl ether of a glycol of the group consisting of alkylene and polyalkylene glycols.

2. A coating composition of slow drying characteristics especially adapted for application by brushing comprising as the essential film-forming ingredients a mixture of nitrocellulose and a vinyl resin resulting from the conjoint polymerization of vinyl chloride with vinyl acetate and containing 65% to 70% vinyl chloride in the polymer; and a solvent for said mixture, said solvent essentially including as both a solvent and a coupling agent a dialkyl ether of a glycol of the group consisting of alkylene and polyalkylene glycols, the ratio of carbon atoms to oxygen atoms in said ether compound being less than 4.

3. A coating composition of slow drying characteristics especially adapted for application by brushing comprising as the essential film-forming ingredients a mixture of nitrocellulose and a vinyl resin resulting from the conjoint polymerization of vinyl chloride with vinyl acetate and containing 65% to 70% vinyl chloride in the polymer; and a solvent for said mixture, said solvent essentially including as both a solvent and coupling agent diethyl ether of ethylene glycol.

4. A coating composition of slow drying characteristics especially adapted for application by brushing comprising as the essential film-forming ingredients a mixture of nitrocellulose and a vinyl resin resulting from the conjoint polymerization of vinyl chloride with vinyl acetate and containing 65% to 70% vinyl chloride in the polymer; and a solvent for said mixture, said solvent essentially including as both a solvent and coupling agent diethyl ether of diethylene glycol.

ARTHUR K. DOOLITTLE.